(12) United States Patent
Davis, Jr.

(10) Patent No.: US 6,446,999 B1
(45) Date of Patent: Sep. 10, 2002

(54) TRAILER HITCH ALIGNMENT SYSTEM

(76) Inventor: Arthur C. Davis, Jr., 3810 Orangewood Dr., Knoxville, TN (US) 37921

( * ) Notice: Subject to any disclaimer, the term of this patent is extended or adjusted under 35 U.S.C. 154(b) by 0 days.

(21) Appl. No.: 09/561,412

(22) Filed: Apr. 28, 2000

(51) Int. Cl.[7] ............................. B60R 1/06; G02B 7/182
(52) U.S. Cl. ...................... 280/477; 280/504; 359/881; 359/841; 248/469
(58) Field of Search ................................ 280/477, 504, 280/511, 508; 359/871, 872, 881, 841; 248/476, 480, 466, 469; 33/264

(56) References Cited

U.S. PATENT DOCUMENTS

| | | | | |
|---|---|---|---|---|
| 3,524,701 A | * | 8/1970 | Strohmeier | 359/841 |
| 3,765,703 A | * | 10/1973 | Voelkerding et al. | 280/477 |
| 3,889,384 A | * | 6/1975 | White | 33/264 |
| 3,918,746 A | * | 11/1975 | Lehtisaari | 280/477 |
| 4,156,972 A | * | 6/1979 | Vankrevelen | 33/264 |
| 4,723,788 A | * | 2/1988 | Suter | 280/477 |
| D329,631 S | * | 9/1992 | Cameron | D12/187 |
| D340,219 S | * | 10/1993 | Moon | D12/187 |
| 5,290,056 A | * | 3/1994 | Fath, IV | 280/477 |
| 5,309,289 A | * | 5/1994 | Johnson | 259/871 |
| 5,482,310 A | * | 1/1996 | Staggs | 280/477 |
| 5,550,681 A | * | 8/1996 | Mazarac | 359/872 |
| 5,779,256 A | * | 7/1998 | Vass | 280/477 |
| 6,076,847 A | * | 6/2000 | Thornton | 280/477 |
| 6,213,608 B1 | * | 4/2001 | Osgood | 359/841 |
| 6,239,926 B1 | * | 5/2001 | De Shazer | 359/841 |

* cited by examiner

Primary Examiner—Robert P. Olszewski
Assistant Examiner—F. Zeender

(57) ABSTRACT

A trailer hitch alignment system for providing a driver of a vehicle the ability to visually align the hitch of the vehicle with the tongue of a trailer. The trailer hitch alignment system includes a hitch including a base portion and a joint member extending from the base portion. The hitch assembly further includes a set rod extending upwardly from the base portion. The set rod is positioned proximate the joint member. A mirror assembly is removably couplable to the set rod. The mirror assembly includes a mirror pivotally coupled to a mirror connection frame. The mirror is pivotal about a generally horizontal axis.

9 Claims, 3 Drawing Sheets

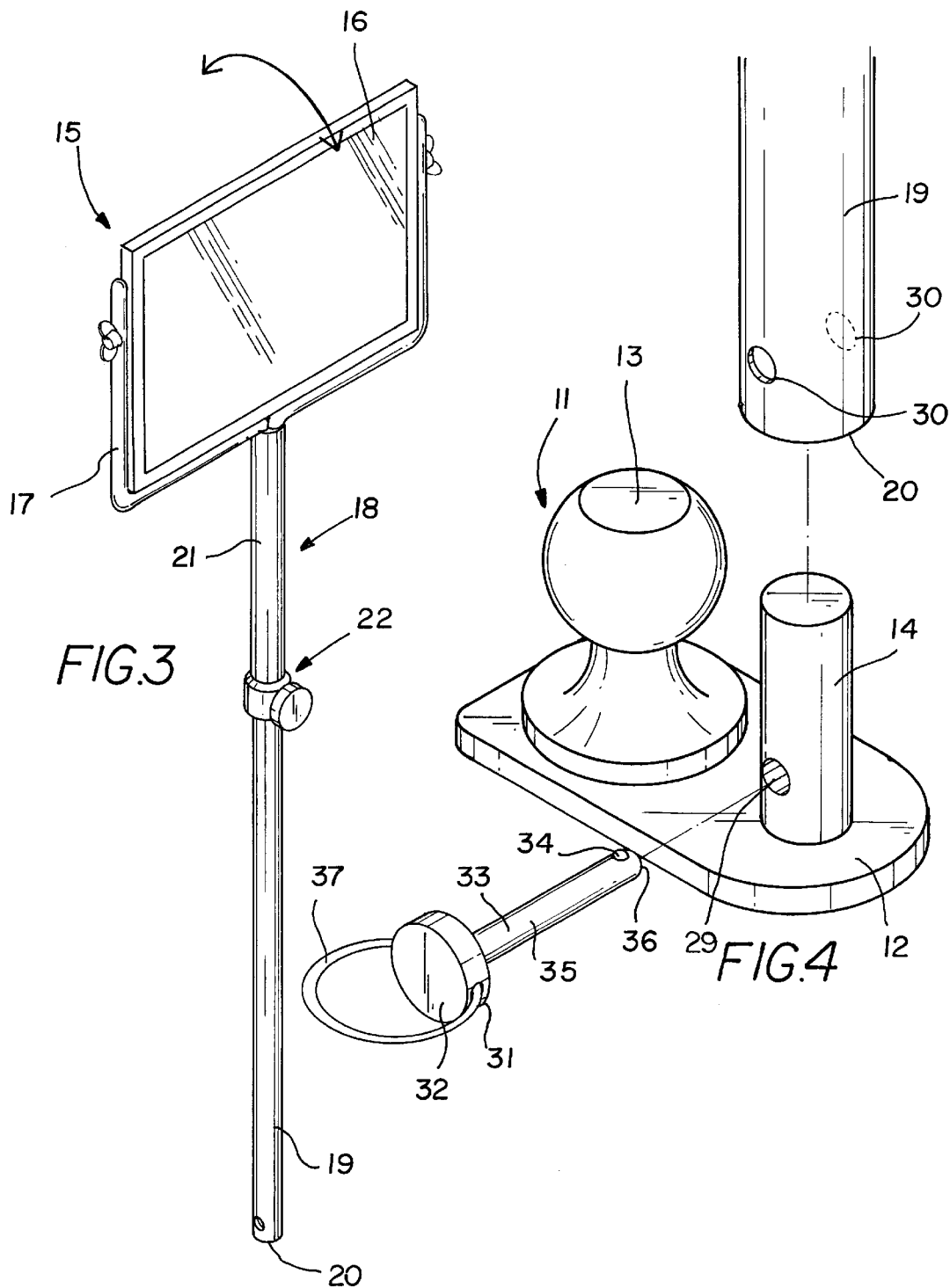

TRAILER HITCH ALIGNMENT SYSTEM

BACKGROUND OF THE INVENTION

1. Field of the Invention

The present invention relates to rear-mounted vehicle mirrors and more particularly pertains to a new trailer hitch alignment system for providing a driver of a vehicle the ability to visually align the hitch of the vehicle with the tongue of a trailer.

2. Description of the Prior Art

The use of rear-mounted vehicle mirrors is known in the prior art. More specifically, rear-mounted vehicle mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,550,681; U.S. Pat. No. 5,309,289; U.S. Pat. No. 5,482,310; U.S. Pat. No. 3,524,701; U.S. Pat. No. Des. 329,631; and U.S. Pat. No. Des. 340,219.

While these devices fulfill their respective, particular objectives and requirements, the aforementioned patents do not disclose a new trailer hitch alignment system. The inventive device includes a hitch assembly designed for being coupled to a towing vehicle. The hitch assembly includes a base portion and a joint member extending from the base portion. The joint member is designed for coupling to a socket of a trailer tongue. The hitch assembly further includes a set rod extending upwardly from the base portion. The set rod is positioned proximate the joint member such that the hitch assembly is designed for being positioned such that the set rod is positioned between the joint member and the towing vehicle when the hitch assembly is coupled to the towing vehicle. A mirror assembly is removably couplable to the set rod. The mirror assembly includes a mirror pivotally coupled to a mirror connection frame. The mirror is pivotal about a generally horizontal axis for facilitating viewing of the joint member by a user in the towing vehicle.

In these respects, the trailer hitch alignment system according to the present invention substantially departs from the conventional concepts and designs of the prior art, and in so doing provides an apparatus primarily developed for the purpose of providing a driver of a vehicle the ability to visually align the hitch of the vehicle with the tongue of a trailer.

SUMMARY OF THE INVENTION

In view of the foregoing disadvantages inherent in the known types of rear-mounted vehicle mirrors now present in the prior art, the present invention provides a new trailer hitch alignment system construction wherein the same can be utilized for providing a driver of a vehicle the ability to visually align the hitch of the vehicle with the tongue of a trailer.

The general purpose of the present invention, which will be described subsequently in greater detail, is to provide a new trailer hitch alignment system apparatus and method which has many of the advantages of the rear-mounted vehicle mirrors mentioned heretofore and many novel features that result in a new trailer hitch alignment system which is not anticipated, rendered obvious, suggested, or even implied by any of the prior art rear-mounted vehicle mirrors, either alone or in any combination thereof.

To attain this, the present invention generally comprises a hitch assembly designed for being coupled to a towing vehicle. The hitch assembly includes a base portion and a joint member extending from the base portion. The joint member is designed for coupling to a socket of a trailer tongue. The hitch assembly further includes a set rod extending upwardly from the base portion. The set rod is positioned proximate the joint member such that the hitch assembly is designed for being positioned such that the set rod is positioned between the joint member and the towing vehicle when the hitch assembly is coupled to the towing vehicle. A mirror assembly is removably couplable to the set rod. The mirror assembly includes a mirror pivotally coupled to a mirror connection frame. The mirror is pivotal about a generally horizontal axis for facilitating viewing of the joint member by a user in the towing vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto, In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch alignment system apparatus and method which has many of the advantages of the rear-mounted vehicle mirrors mentioned heretofore and many novel features that result in a new trailer hitch alignment system which is not anticipated, rendered obvious, suggested, or even implied by any of the prior art rear-mounted vehicle mirrors, either alone or in any combination thereof.

It is another object of the present invention to provide a new trailer hitch alignment system that may be easily and efficiently manufactured and marketed.

It is a further object of the present invention to provide a new trailer hitch alignment system that is of a durable and reliable construction.

An even further object of the present invention is to provide a new trailer hitch alignment system which is susceptible of a low cost of manufacture with regard to both materials and labor, and which accordingly is then susceptible of low prices of sale to the consuming public, thereby making such trailer hitch alignment system economically available to the buying public.

Still yet another object of the present invention is to provide a new trailer hitch alignment system which provides in the apparatuses and methods of the prior art some of the advantages thereof, while simultaneously overcoming some of the disadvantages normally associated therewith.

Still another object of the present invention is to provide a new trailer hitch alignment system for providing a driver of a vehicle the ability to visually align the hitch of the vehicle with the tongue of a trailer.

Yet another object of the present invention is to provide a new trailer hitch alignment system which includes a hitch assembly designed for being coupled to a towing vehicle. The hitch assembly includes a base portion and a joint member extending from the base portion. The joint member is designed for coupling to a socket of a trailer tongue. The hitch assembly further includes a set rod extending upwardly from the base portion. The set rod is positioned proximate the joint member such that the hitch assembly is designed for being positioned such that the set rod is positioned between the joint member and the towing vehicle when the hitch assembly is coupled to the towing vehicle. A mirror assembly is removably couplable to the set rod. The mirror assembly includes a mirror pivotally coupled to a mirror connection frame. The mirror is pivotal about a generally horizontal axis for facilitating viewing of the joint member by a user in the towing vehicle.

Still yet another object of the present invention is to provide a new trailer hitch alignment system that allows a driver to align the hitch of a vehicle with the tongue of a trailer while backing the vehicle towards the trailer.

Even still another object of the present invention is to provide a new trailer hitch alignment system that facilitates the alignment of a hitch of a vehicle with the tongue of a trailer without the need of a second person to provide guidance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged perspective view of the present invention.

FIG. 4 is a perspective view of the mirror assembly of the present invention.

DESCRIPTION OF THE PREFERRED EMBODIMENT

Figure 1:
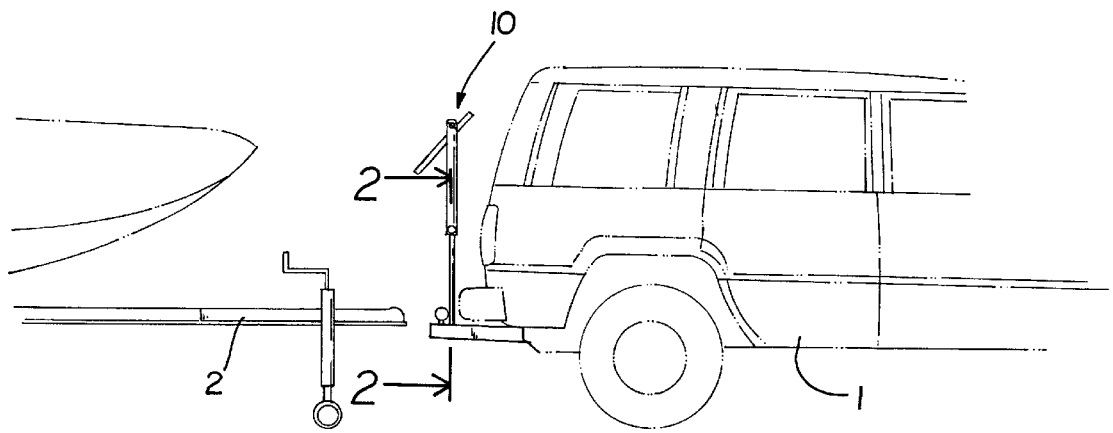
FIG. 1 is an elevational view of a new trailer hitch alignment system according to the present invention.

With reference now to the drawings, and in particular to FIGS. 1 through 5 thereof, a new trailer hitch alignment system embodying the principles and concepts of the present invention and generally designated by the reference numeral 10 will be described.

As best illustrated in FIGS. 1 through 5, the trailer hitch alignment system 10 generally comprises a hitch assembly 11 designed for coupling to a towing vehicle 1. The hitch assembly includes a base portion 12 and a joint member 13 extending from the base portion. The base portion has a length of about 4 inches and a width of about 2 inches. The joint member is designed for coupling to a socket of a trailer tongue. The hitch assembly further includes a set rod 14 extending upwardly from the base portion. The set rod has a height of about 6 inches. The set rod is positioned proximate the joint member such that the hitch assembly is designed for positioning such that the set rod is positioned between the joint member and the towing vehicle when the hitch assembly is coupled to the towing vehicle.

As shown in FIG. 3, a mirror assembly 15 removably couplable to the set rod. The mirror assembly includes a mirror 16 pivotally coupled to a mirror connection frame 17. The mirror is pivotally coupled to the mirror connection frame at a point such that the mirror is offset for allowing a greater viewing area behind the vehicle. The mirror has a length between about 16 inches and about 18 inches. The mirror has width between about 12 inches and 14 inches. The mirror is pivotal about a generally horizontal axis for facilitating viewing of the joint member by a user in the towing vehicle. The mirror assembly includes a rod assembly 18 extending from the mirror frame. The rod assembly has a height of about 50 inches. The rod assembly includes a base rod 19 comprising a hollow first end 20 for receiving the set rod whereby the base rod is held in a substantially vertical position. The rod assembly includes an extension rod 21 coupled to the base rod. The extension rod is extendable relative to the base rod whereby the rod assembly is telescopic for adjusting a length of the rod assembly.

Figure 2:
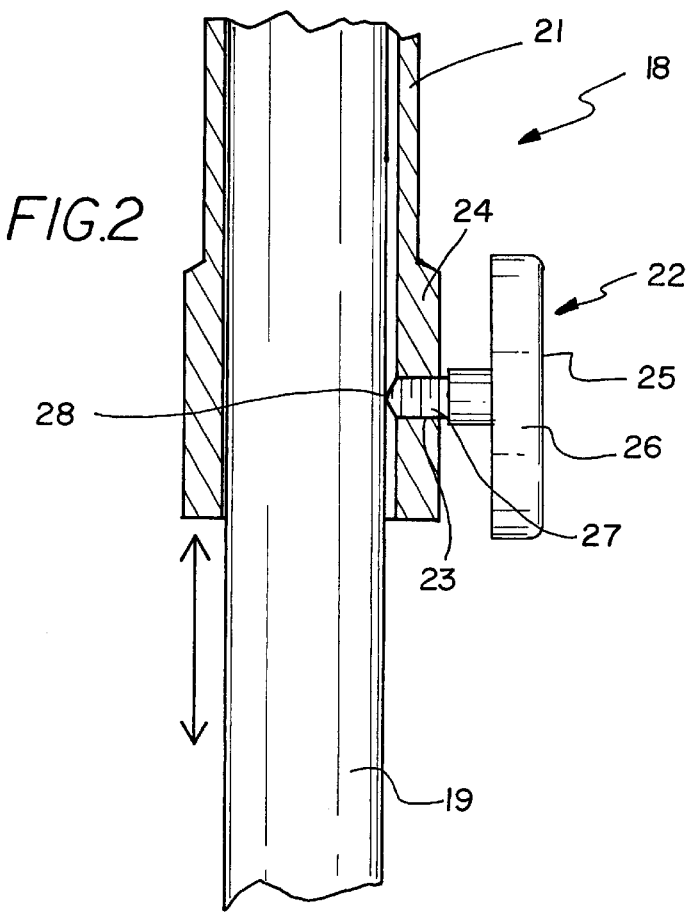
FIG. 2 is a partial cross-sectional view of the present invention taken along line 2—2 of FIG. 1.

As shown in FIG. 2, a locking mechanism 22 for selectively holding the extension rod in a static position relative to the base rod. The locking mechanism includes a threaded aperture 23 extending through a collar portion 24 of the extension rod. The base rod is slidably inserted into the extension rod. The locking mechanism further includes a locking member 25 comprising an adjuster knob 26 and a threaded set screw 27 extending from the adjuster knob. The set screw is threadingly engageable to the threaded aperture for frictionally engaging an outer surface of the base rod whereby the extension rod is held in the static position relative to the base rod. The set screw comprises a pointed distal 28 end for facilitating frictional engagement of the outer surface of the base rod. The set rod comprises a locking hole 29 extending through the set pin. The base rod comprises a pair of aligned locking apertures 30. The locking apertures are alignable with opposite ends of the locking hole.

A pin member 31 is insertable through the locking hole and the locking apertures when the locking apertures are aligned with the locking hole whereby the set screw is selectively engageable to the base rod. The pin member comprises a head portion 32. A pin portion 33 extends from the head portion, and a rounded locking member 34 is retractably biased outwardly from an outer surface 35 of the pin portion proximate a distal end 36 of the pin portion. The rounded locking member is for preventing slipping of the pin from a locking position defined by the pin member being fully inserted through the locking hole and the locking apertures. A ring member 37 is coupled to the head portion for facilitating removal of the pin member from the locking position.

Figure 5:
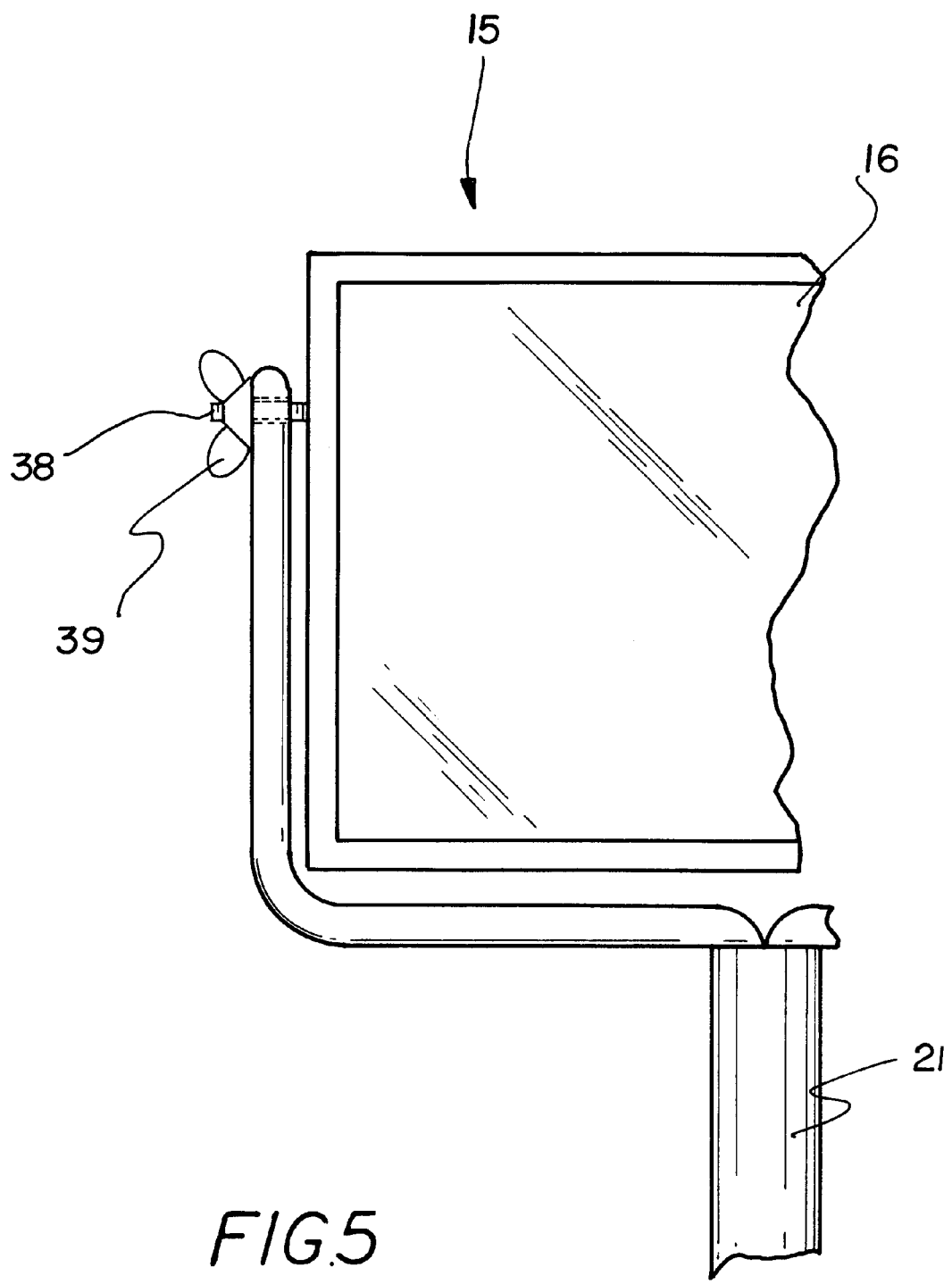
FIG. 5 is an enlarged elevational view of the mirror assembly of the present invention.

As shown in FIG. 5, the mirror includes a pair of mirror pivot arms 38. Each of the mirror pivot arms extend from an associated side of the mirror. Each of the mirror pivot arms extends through an associated pivot hole in the mirror connection frame.

A pair of mirror connection members 39 each are engageable to an associated one of the mirror pivot arms whereby the mirror connection frame is coupled to the mirror. Each of the connection members is tightenable for promoting frictional engagement of the mirror connection frame to the mirror for holding the mirror in a selectable static position relative to the mirror connection frame.

In use, the user places the base rod on the set rod and secures the base rod to the set rod. The user then extends the extension rod so that the mirror is in a position that allows the driver of the vehicle to view the joint member and the tongue of a trailer 2 as the user backs the vehicle towards the trailer. The user then disconnects the base rod from the set rod and stores the mirror assembly for future use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch alignment system comprising:
    a hitch assembly adapted for being coupled to a towing vehicle, said hitch assembly including a base portion and a joint member extending from said base portion, said joint member being adapted for coupling to a socket of a trailer tongue, said hitch assembly further including a set rod extending upwardly from said base portion, said set rod being positioned proximate said joint member such that said hitch assembly is adapted for being positioned such that said set rod is positioned between said joint member and the towing vehicle when the hitch assembly is coupled to the towing vehicle;
    a mirror assembly removably couplable to said set rod, said mirror assembly including a mirror pivotally coupled to a mirror connection frame, said mirror being pivotal about a generally horizontal axis for facilitating viewing of said joint member by a user in the towing vehicle;
    said mirror assembly including a rod assembly extending from said mirror frame, said rod assembly including a base rod having a hollow first end for receiving said set rod whereby said base rod is held in a substantially vertical position; and
    said rod assembly including an extension rod coupled to said base rod, said extension rod being extendable relative to said base rod whereby said rod assembly is telescopic for adjusting a length of said rod assembly, said base rod being insertable into said extension rod.

2. The trailer hitch alignment system of claim 1, further comprising:
    a locking mechanism for selectively holding said extension rod in a static position relative to said base rod;
    said locking mechanism including a threaded aperture extending through a collar portion of said extension rod, said base rod being slidably inserted into said extension rod;
    said locking mechanism further including a locking member having an adjuster knob and a threaded set screw extending from said adjuster knob, said set screw being threadingly engageable to said threaded aperture for frictionally engaging an outer surface of said base rod whereby said extension rod is held in said static position relative to said base rod.

3. The trailer hitch alignment system of claim 2, further comprising:
    said set screw having a pointed distal end for facilitating frictional engagement of said outer surface of said base rod.

4. The trailer hitch alignment system of claim 1, further comprising:
    said set rod having a locking hole extending through said set rod;
    said base rod having a pair of aligned locking apertures, said locking apertures being alignable with opposite ends of said locking hole;
    a pin member, said pin member being insertable through said locking hole and said locking apertures when said locking apertures are aligned with said locking hole whereby a set screw is selectively engageable to said base rod.

5. The trailer hitch alignment system of claim 4, further comprising:
    said pin member having a head portion, a pin portion extending from said head portion, and a rounded locking member retractably biased outwardly from an outer surface of said pin portion proximate a distal end of said pin portion, said rounded locking member being for preventing slipping of said pin member from a locking position defined by said pin member being fully inserted through said locking hole and said locking apertures.

6. The trailer hitch alignment system of claim 4, further comprising:
    said pin member having a head portion; and
    a ring member coupled to said head portion for facilitating removal of said pin member from said locking hole and said locking apertures.

7. The trailer hitch alignment system of claim 1, further comprising:
    said mirror including a pair of mirror pivot arms, each of said mirror pivot arms extending from an associated side of said mirror;
    each of said mirror pivot arms extending through an associated pivot hole in said mirror connection frame;
    a pair of mirror connection members, each mirror connection member being engageable to an associated one of said mirror pivot arms whereby said mirror connection frame is coupled to said mirror.

8. The trailer hitch alignment system of claim 7, further comprising:

each of said connection members being tightenable for promoting frictional engagement of said mirror connection frame to said mirror for holding said mirror in a selectable static position relative to said mirror connection frame.

9. A trailer hitch alignment system comprising:

a hitch assembly adapted for being coupled to a towing vehicle, said hitch assembly including a base portion and a joint member extending from said base portion, said joint member being adapted for coupling to a socket of a trailer tongue, said hitch assembly further including a set rod extending upwardly from said base portion, said set rod being positioned proximate said joint member such that said hitch assembly is adapted for being positioned such that said set rod is positioned between said joint member and the towing vehicle when the hitch assembly is coupled to the towing vehicle;

a mirror assembly removably couplable to said set rod, said mirror assembly including a mirror pivotally coupled to a mirror connection frame, said mirror being pivotal about a generally horizontal axis for facilitating viewing of said joint member by a user in the towing vehicle;

said mirror assembly including a rod assembly extending from said mirror frame, said rod assembly including a base rod having a hollow first end for receiving said set rod whereby said base rod is held in a substantially vertical position;

said rod assembly including an extension rod coupled to said base rod, said extension rod being extendable relative to said base rod whereby said rod assembly is telescopic for adjusting a length of said rod assembly;

a locking mechanism for selectively holding said extension rod in a static position relative to said base rod;

said locking mechanism including a threaded aperture extending through a collar portion of said extension rod, said base rod being slidably inserted into said extension rod;

said locking mechanism further including a locking member having an adjuster knob and a threaded set screw extending from said adjuster knob, said set screw being threadingly engageable to said threaded aperture for frictionally engaging an outer surface of said base rod whereby said extension rod is held in said static position relative to said base rod;

said set screw having a pointed distal end for facilitating frictional engagement of said outer surface of said base rod;

said set rod having a locking hole extending through said set rod;

said base rod having a pair of aligned locking apertures, said locking apertures being alignable with opposite ends of said locking hole;

a pin member, said pin member being insertable through said locking hole and said locking apertures when said locking apertures are aligned with said locking hole whereby said set screw is selectively engageable to said base rod;

said pin member having a head portion, a pin portion extending from said head portion, and a rounded locking member retractably biased outwardly from an outer surface of said pin portion proximate a distal end of said pin portion, said rounded locking member being for preventing slipping of said pin member from a locking position defined by said pin member being fully inserted through said locking hole and said locking apertures;

a ring member coupled to said head portion for facilitating removal of said pin member from said locking position;

said mirror including a pair of mirror pivot arms, each of said mirror pivot arms extending from an associated side of said mirror;

each of said mirror pivot arms extending through an associated pivot hole in said mirror connection frame;

a pair of mirror connection members, each mirror connection member being engageable to an associated one of said mirror pivot arms whereby said mirror connection frame is coupled to said mirror; and each of said connection members being tightenable for promoting frictional engagement of said mirror connection frame to said mirror for holding said mirror in a selectable static position relative to said mirror connection frame.

* * * * *